US010251108B2

United States Patent
Jung et al.

(10) Patent No.: US 10,251,108 B2
(45) Date of Patent: Apr. 2, 2019

(54) METHOD FOR PERFORMING INTERWORKING OF TERMINAL IN WIRELESS COMMUNICATIONS SYSTEM, AND TERMINAL USING SAME

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 15/510,629

(22) PCT Filed: Sep. 18, 2015

(86) PCT No.: PCT/KR2015/009840
§ 371 (c)(1),
(2) Date: Mar. 10, 2017

(87) PCT Pub. No.: WO2016/043559
PCT Pub. Date: Mar. 24, 2016

(65) Prior Publication Data
US 2017/0289890 A1    Oct. 5, 2017

Related U.S. Application Data

(60) Provisional application No. 62/052,455, filed on Sep. 18, 2014.

(51) Int. Cl.
*H04W 36/22* (2009.01)
*H04W 28/02* (2009.01)
(Continued)

(52) U.S. Cl.
CPC ............ *H04W 36/22* (2013.01); *H04L 43/16* (2013.01); *H04W 24/02* (2013.01); *H04W 24/10* (2013.01);
(Continued)

(58) Field of Classification Search
None
See application file for complete search history.

(56) References Cited

U.S. PATENT DOCUMENTS

| 2011/0222523 | A1  | 9/2011 | Fu et al. |
| 2013/0070679 | A1* | 3/2013 | Wegmann ......... H04W 36/0083 370/328 |

(Continued)

FOREIGN PATENT DOCUMENTS

| WO | 2014119968 | 8/2014 |
| WO | 2014137169 | 9/2014 |

OTHER PUBLICATIONS

3rd Generation Partnership Project (3GPP), "Technical Specification Group Radio Access Network; Evolved Universal Terrestrial Radio Access (E-UTRA); Physical Channels and Modulation (Release 8)," 3GPP TS 36.211 V8.7.0, May 2009, 83 pages.

(Continued)

*Primary Examiner* — Anh Ngoc M Nguyen
(74) *Attorney, Agent, or Firm* — Lee, Hong, Degerman, Kang & Waimey

(57) ABSTRACT

Provided are a method for performing interworking of a terminal in a wireless communications system, and a terminal using said method. The method comprises the steps of: receiving a threshold value with respect to a single parameter in which a plurality of parameters for determining whether a traffic control is performed between a first network and a second network are combined; measuring the value of the single parameter with respect to the second (Continued)

network; and determining whether traffic control has been performed by comparing the result of the measurement of the single parameter to the threshold value.

18 Claims, 12 Drawing Sheets

(51) Int. Cl.
    *H04W 36/30*     (2009.01)
    *H04W 88/06*     (2009.01)
    *H04L 12/26*     (2006.01)
    *H04W 24/02*     (2009.01)
    *H04W 24/10*     (2009.01)
    *H04W 48/20*     (2009.01)

(52) U.S. Cl.
    CPC ....... *H04W 28/02* (2013.01); *H04W 28/0205* (2013.01); *H04W 36/30* (2013.01); *H04W 88/06* (2013.01); *H04W 48/20* (2013.01)

(56) References Cited

U.S. PATENT DOCUMENTS

| | | | |
|---|---|---|---|
| 2013/0178212 A1* | 7/2013 | Maida | H04W 36/0083 455/436 |
| 2013/0242783 A1 | 9/2013 | Horn et al. | |
| 2014/0204927 A1 | 7/2014 | Horn et al. | |
| 2015/0351024 A1* | 12/2015 | Jang | H04W 48/18 370/329 |
| 2016/0007238 A1* | 1/2016 | Salkintzis | H04W 36/0022 455/439 |

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 8)," 3GPP TS 36.304 V8.5.0, Mar. 2009, 30 pages.
PCT International Application No. PCT/KR2015/009840, Written Opinion of the International Searching Authority dated Jan. 29, 2016, 4 pages.

* cited by examiner

METHOD FOR PERFORMING INTERWORKING OF TERMINAL IN WIRELESS COMMUNICATIONS SYSTEM, AND TERMINAL USING SAME

CROSS-REFERENCE TO RELATED APPLICATIONS

This application is the National Stage filing under 35 U.S.C. 371 of International Application No. PCT/KR2015/009840, filed on Sep. 18, 2015, which claims the benefit of U.S. Provisional Application No. 62/052,455, filed on Sep. 18, 2014, the contents of which are all hereby incorporated by reference herein in its entirety.

BACKGROUND OF THE INVENTION

Field of the Invention

The present invention relates to wireless communication and, more particularly, to a method for performing interworking between heterogeneous networks in a wireless communication system and a UE using the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. In recent years, there is an ongoing discussion on 3GPP LTE-advanced (LTE-A) that is an evolution of the 3GPP LTE.

A wireless communication system may have support for services to UEs over multiple access networks. For example, a UE may receive service from a 3GPP access network, which is a mobile wireless communication system, and also may receive service from a non-3GPP access network, such as WIMAX (Worldwide Interoperability for Microwave Access) or WLAN (Wireless Local Area Network).

A UE may establish a connection with a 3GPP access network to receive a service, and, if traffic overload occurs to the 3GPP access network, may handle the traffic by another access network, i.e., a non-3GPP access network, to improve the overall network efficiency. Reversely, a UE connected to a non-3GPP access network may handle traffic using a 3GPP access network for efficiency.

Suppose that there are two different networks: a first network and a second network. Interworking refers to the ability of a UE connected to the first network to access and use resources or services offered by the second network. By means of interworking, the UE may allow the second network to handle traffic that is supposed to be handled by the first network or allow the first network to handle traffic that is supposed to be handled by the second network. This may be called traffic steering.

A plurality of parameters may be configured for a network, which a UE can use to decide whether to perform interworking or not. For example, in order to decide whether to perform interworking to steer traffic from the first network to the second network, parameters for conditions the first network has to meet and parameters for conditions the second network has to meet are configured, and threshold are given for these parameters. The UE may decide whether the conditions are met or not by comparing the measurement value of each parameter with the corresponding threshold.

In the conventional art, however, it was necessary that all these parameters—that is, all these conditions—should be met in order to steer traffic from the first network to the second network or vice versa. For this reason, if any of these conditions, even of relatively low importance, is not met, an unreasonable situation may occur in which traffic cannot be steered.

SUMMARY OF THE INVENTION

The present invention provides a method for performing interworking in a wireless communication system and a UE using the same.

Provided is a method for performing interworking of user equipment (UE) in a wireless communication system. The method includes receiving a threshold for a single parameter obtained by combining a plurality of parameters for deciding whether to perform traffic steering between a first network and a second network, measuring the value of the single parameter with respect to the second network and deciding whether to perform traffic steering or not by comparing a measurement of the single parameter with the threshold.

The plurality of parameters comprise the channel utilization, downlink backhaul data rate, and uplink backhaul data rate in the second network.

If the value of the single parameter with respect to the second network is higher than the threshold, the traffic handled by the first network may be steered so as to be handled by the second network.

When steering traffic from the first network to the second network, there may be a plurality of parameters representing conditions the first network has to meet.

The plurality of parameters representing conditions the first network has to meet may comprise at least two of the following: the RSRP (reference signal received power) and RSRQ (reference signal receive quality) measurement values of the first network and the load measurement value of the first network.

If the value of the single parameter with respect to the second network is higher than the threshold, traffic may be steered from the first network to the second network, regardless of whether the conditions for other parameters for steering traffic from the first network to the second network are met or not.

If the value of the single parameter with respect to the second network is lower than the threshold, the traffic handled by the second network may be steered so as to be handled by the first network.

If the value of the single parameter with respect to the second network is lower than the threshold, traffic may be steered from the second network to the first network, regardless of whether the conditions for other parameters for steering traffic from the second network to the first network are met or not.

A first threshold for steering traffic from the first network to the second network and a second threshold for steering traffic from the second network to the first network may have different values.

A first threshold for steering traffic from the first network to the second network and a second threshold for steering traffic from the second network to the first network may have the same value.

In another aspect, provided is a UE for performing interworking in a wireless communication system. The UE includes a RA (radio frequency) unit that transmits and receives radio signals and a processor functionally coupled to the RF unit to operate. The processor receives a threshold for a single parameter obtained by combining a plurality of parameters for deciding whether to perform traffic steering between a first network and a second network, measures the value of the single parameter with respect to the second network, and decides whether to perform traffic steering or not by comparing a measurement of the single parameter with the threshold.

According to an embodiment of the present invention, it is possible to determine whether to perform traffic steering or not by comparing the value of a single parameter obtained by combining a plurality of parameters for deciding whether to perform traffic steering or not, with thresholds. The single parameter may be obtained by combining a plurality of parameters for deciding whether to perform traffic steering or not, with different factors applied to them according to importance. For this reason, in the conventional art, if any of these conditions, even of relatively low importance, is not met, traffic steering cannot be performed, whereas, in the present invention, traffic steering can be performed. Accordingly, system efficiency can be improved.

DESCRIPTION OF EXEMPLARY EMBODIMENTS

Figure 1:
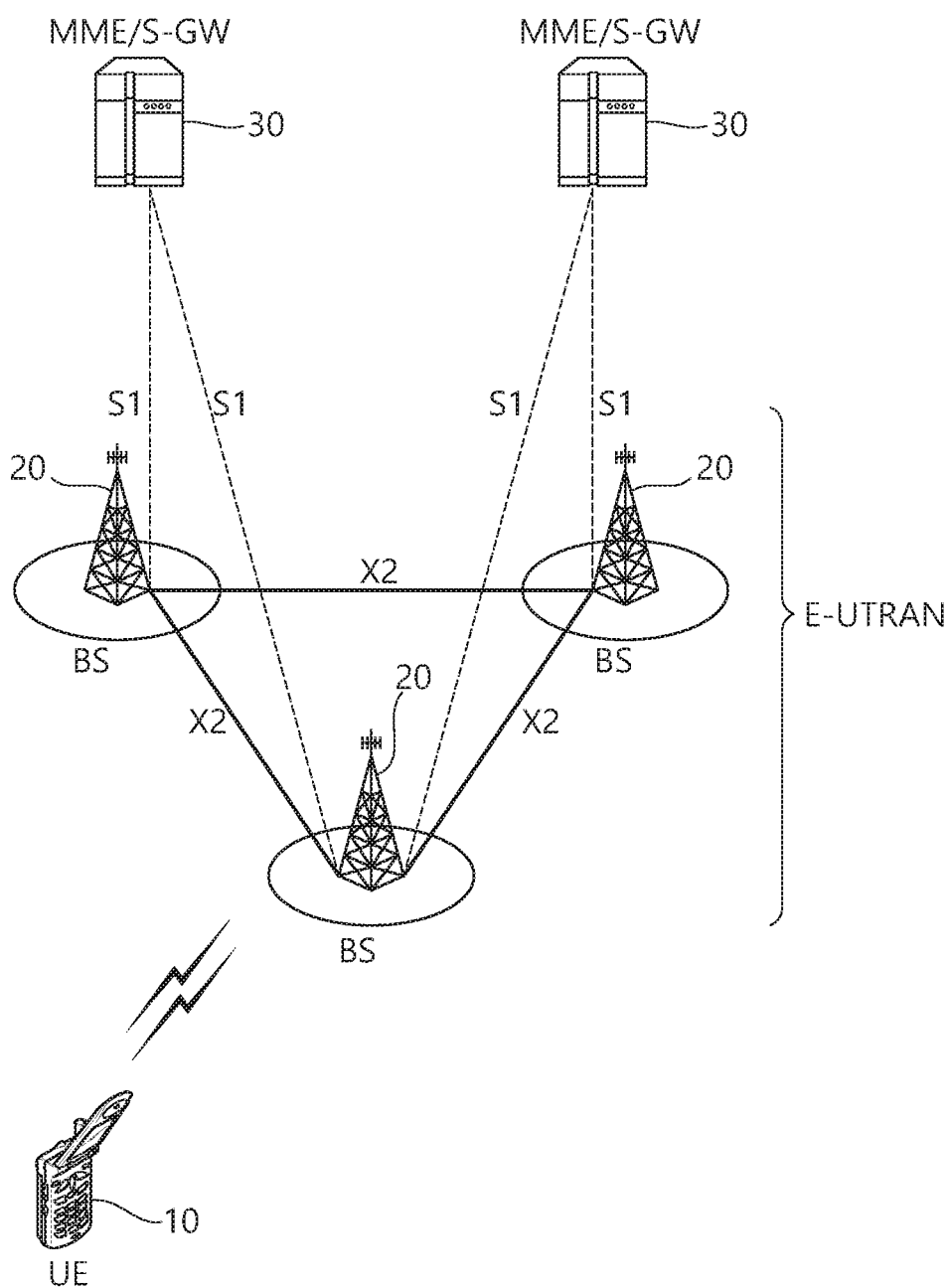
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
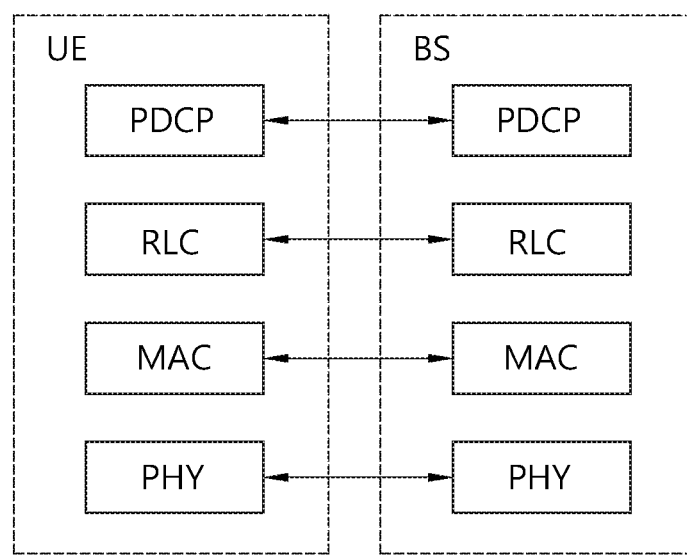
FIG. 2 is a diagram showing a wireless protocol architecture for a user plane.
Figure 3:
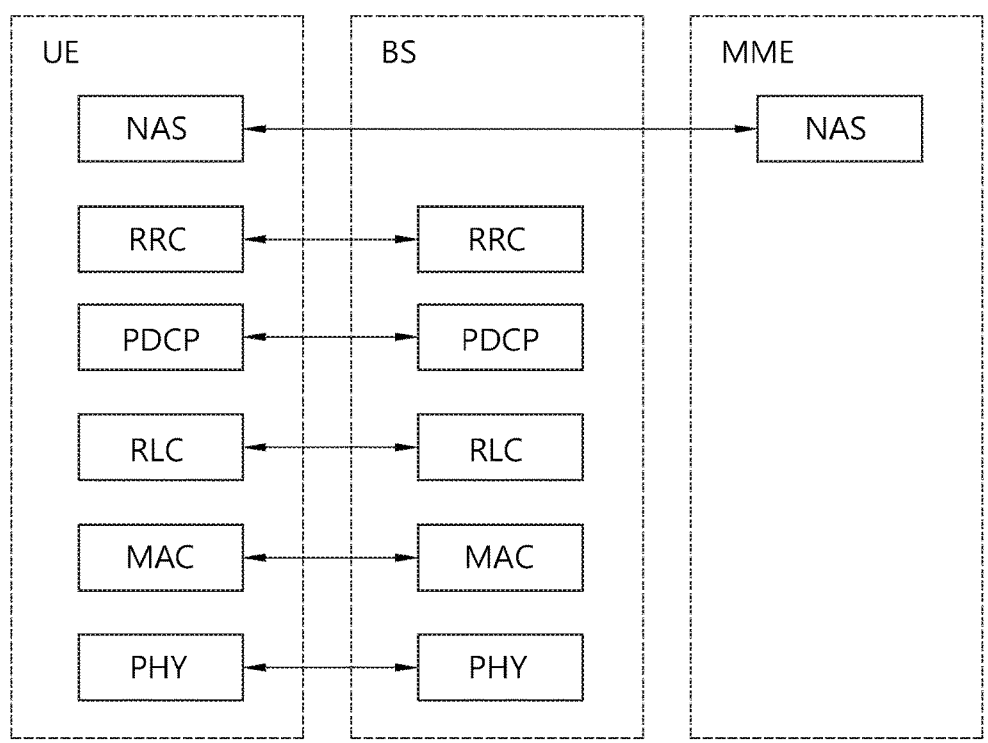
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

As set forth in 3GPP TS 36.211 V8.7.0, physical channels, in 3GPP LTE, may be divided into data channels, such as a PDSCH (Physical Downlink Shared Channel) and a PUSCH (Physical Uplink Shared Channel), and control channels, such as a PDCCH (Physical Downlink Control Channel), a PCFICH (Physical Control Format Indicator Channel), a PHICH (Physical Hybrid-ARQ Indicator Channel), and a PUCCH (Physical Uplink Control Channel).

The PCFICH, which is transmitted in the first OFDM symbol of a sub-frame, carries a CFI (control format indicator) regarding the number of OFDM symbols (i.e., size of the control region) used for transmission of control channels in the sub-frame. UE receives the CFI over the PCFICH and then monitors the PDCCH.

The PDCCH is a downlink control channel, and is also called a scheduling channel in a sense that it carries scheduling information. The control information transmitted through the PDCCH is referred to as downlink control information (DCI). The DCI may include resource allocation of the PDSCH (also referred to as DL (downlink) grant), resource allocation of the PUSCH (also referred to as UL (uplink) grant), a set of transmit power control commands for individual UEs in a certain UE group and/or VoIP (Voice over Internet Protocol) activation.

In 3GPP LTE, blind decoding is used for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel or not.

After determining the PDCCH format according to the DCI to be sent to the UE, the base station adds a CRC (Cyclic Redundancy Check) to the DCI and masks the CRC with a unique identifier (which is referred to as RNTI (Radio Network Temporary Identifier)) depending on the owner or purpose of the PDCCH.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes 51 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
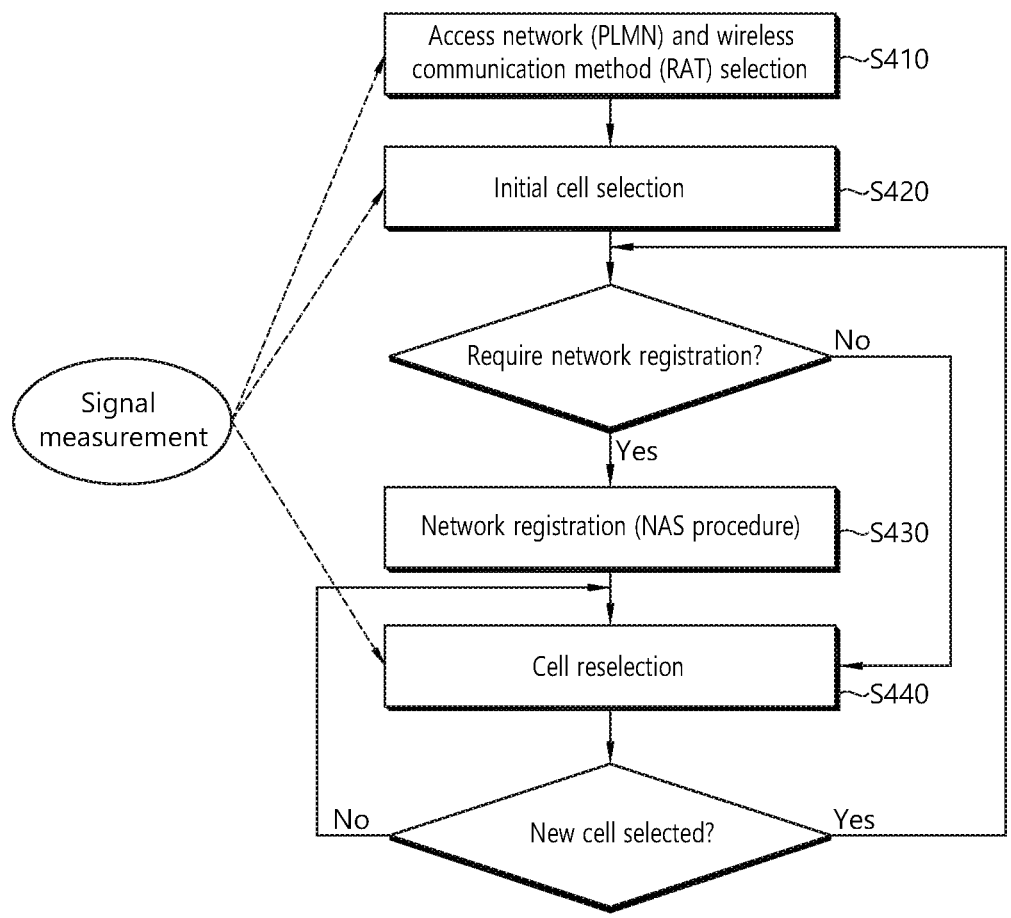
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
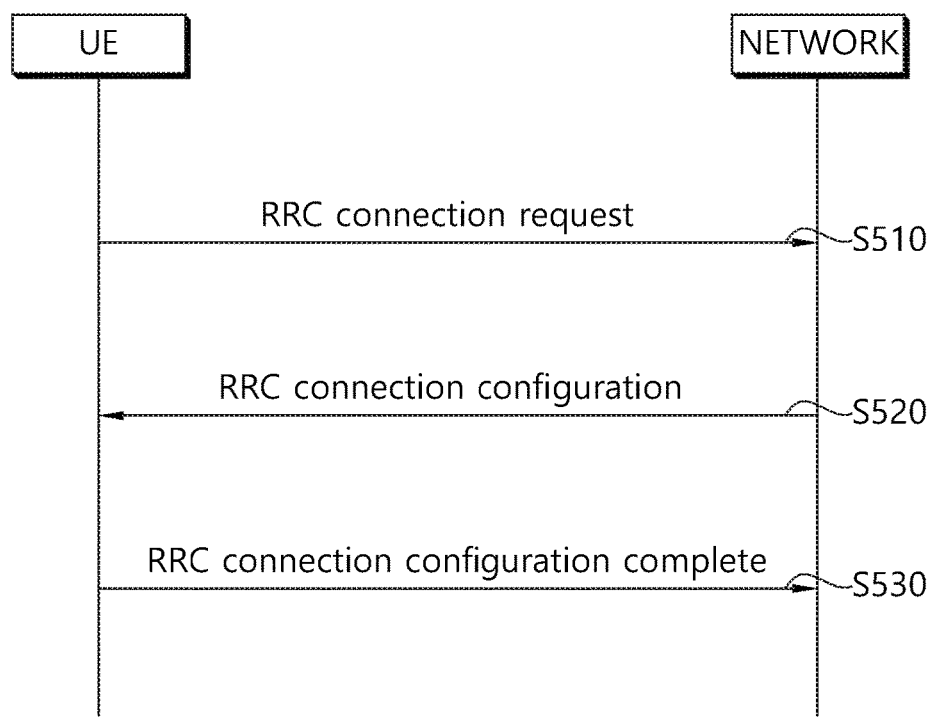
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
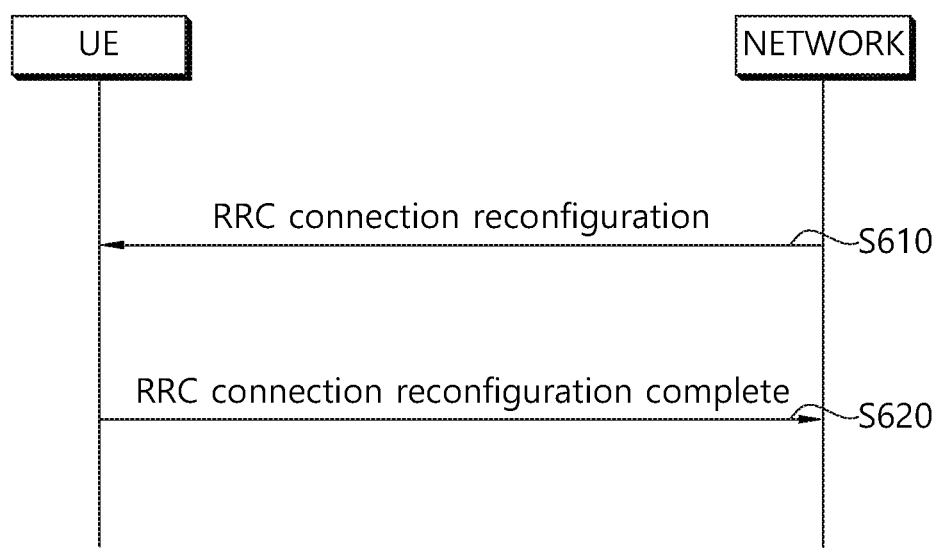
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a UE (terminal).

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$\text{Srxlev} > 0 \text{ AND Squal} > 0 \qquad \text{[Equation 1]}$$

where:

Srxlev=$Q_{rxlevmeas}$−($Q_{rxlevmin}$+$Q_{rxlevminoffset}$)−Pcompensation

Squal=$Q_{qualmeas}$−($Q_{qualmin}$+$Q_{qualminoffset}$))

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX}$-$P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Figure 7:
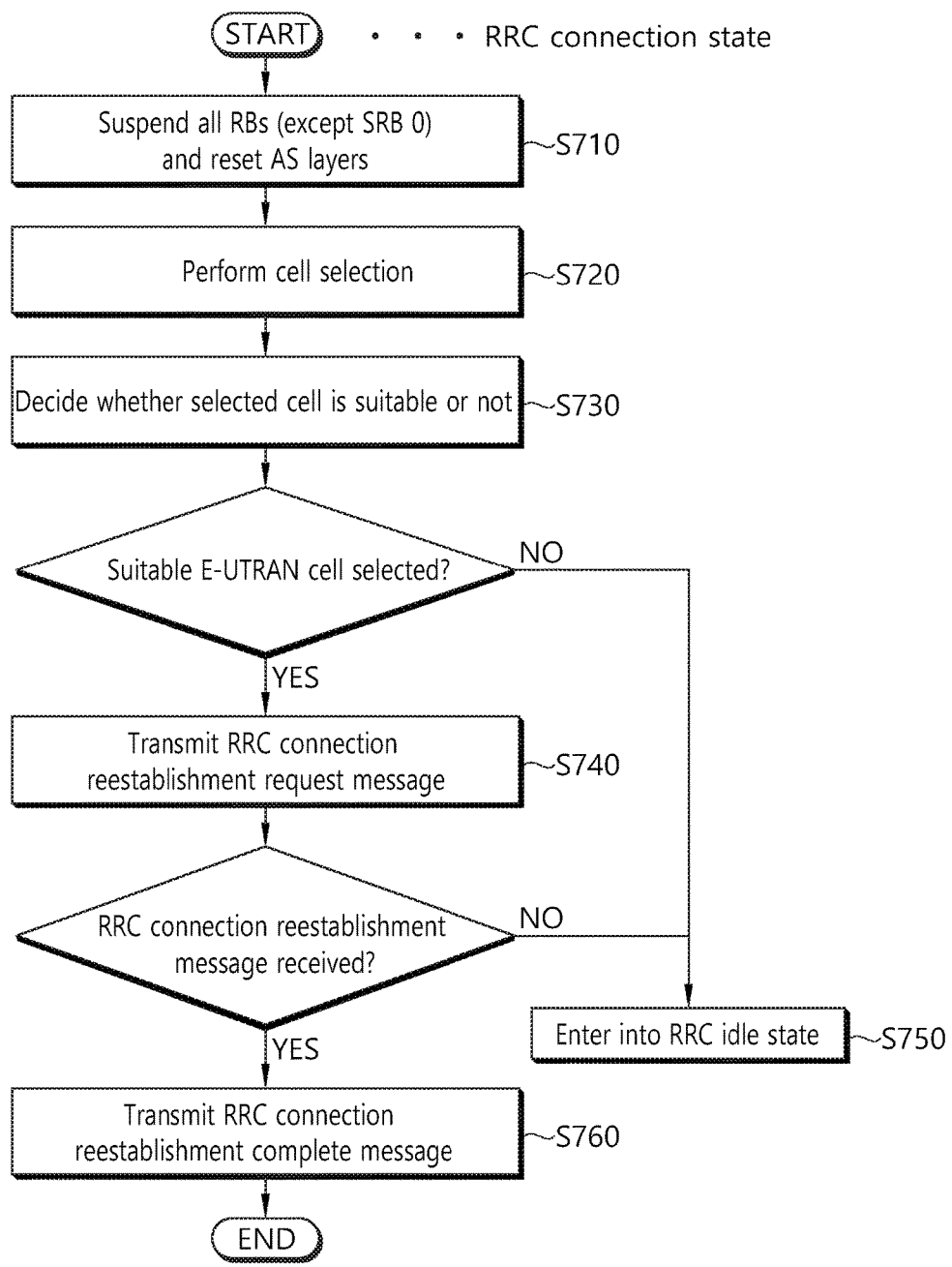
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, interworking between a 3GPP access network and a non-3GPP network will be described.

In 3GPP, ANDSF (Access Network Discovery and Selection Functions) for discovering and selecting connectable access networks were standardized since interworking with non-3GPP access networks (e.g., wireless local area network: WLAN) was first introduced in Release 8. An ANDSF provides discovery information (e.g., WLAN and WiMAX locations), which is a list of networks that may be available in the vicinity of the UE, inter-system mobility policies (ISMP), which reflect an operator's policies, and an inter-system routing policy (ISRP). Based on this information, the UE may decide which traffic to transmit via which access network. The ISMP may include network selection rules for a UE with no more than one active access network connection (e.g., either WLAN or 3GPP LTE/LTE-A). The ISRP may include network selection rules for a UE with potentially more than one active access network connection (e.g., both WLAN and 3GPP LTE/LTE-A). The ISRP includes MAPCON (multiple-access PDN connectivity, IFOM (IP flow mobility), and non-seamless WLAN offloading. OMA DM (Open Mobile Alliance Device Management), etc. is used for dynamic provision between the ANDSF and the UE.

The MAPCON is a standardization of a technology which enables configuring and maintaining multiple packet data network (PDN) connectivity simultaneously through a 3GPP access network and a non-3GPP access network, and enables a seamless traffic offloading in units of all active PDN connections. To this end, an ANDSF server provides information, such as access point names (APN) for offloading, a routing rule on the priority order of access networks, a time of day for offloading, and a validity area of access networks for offloading. Offloading may be defined as the transfer of loads/traffic from a first access network to a second access network.

The IFOM supports more flexible and subdivided IP flow mobility and seamless offloading than the MAPCON. As opposed to the MAPCON, a technical feature of the IFOM enables the UE to access a packet data network through different access networks even when connecting to the packet data network by using the same access point name (APN), and achieves service provision flexibility by enabling mobility and offloading units to move, not on a per-packet data network (PDN) basis but on a per-service IP traffic flow basis. To this end, the ANDSF server provides information, such as an IP flow to be offloaded, a routing rule on the priority order of access networks, a time of day for offloading, and a validity area of access networks for offloading.

The non-seamless WLAN offloading is a technology that does not only change the path of specific IP traffic to a WLAN but also completely offloads the traffic so that it does not pass through an EPC. Since the traffic is not anchored to a P-GW for supporting the mobility, the offloaded IP traffic may not be seamlessly moved back to the 3GPP access network. To this end, the ANDSF server provides the UE with information similar to the information provided to perform the IFOM.

Figure 8:
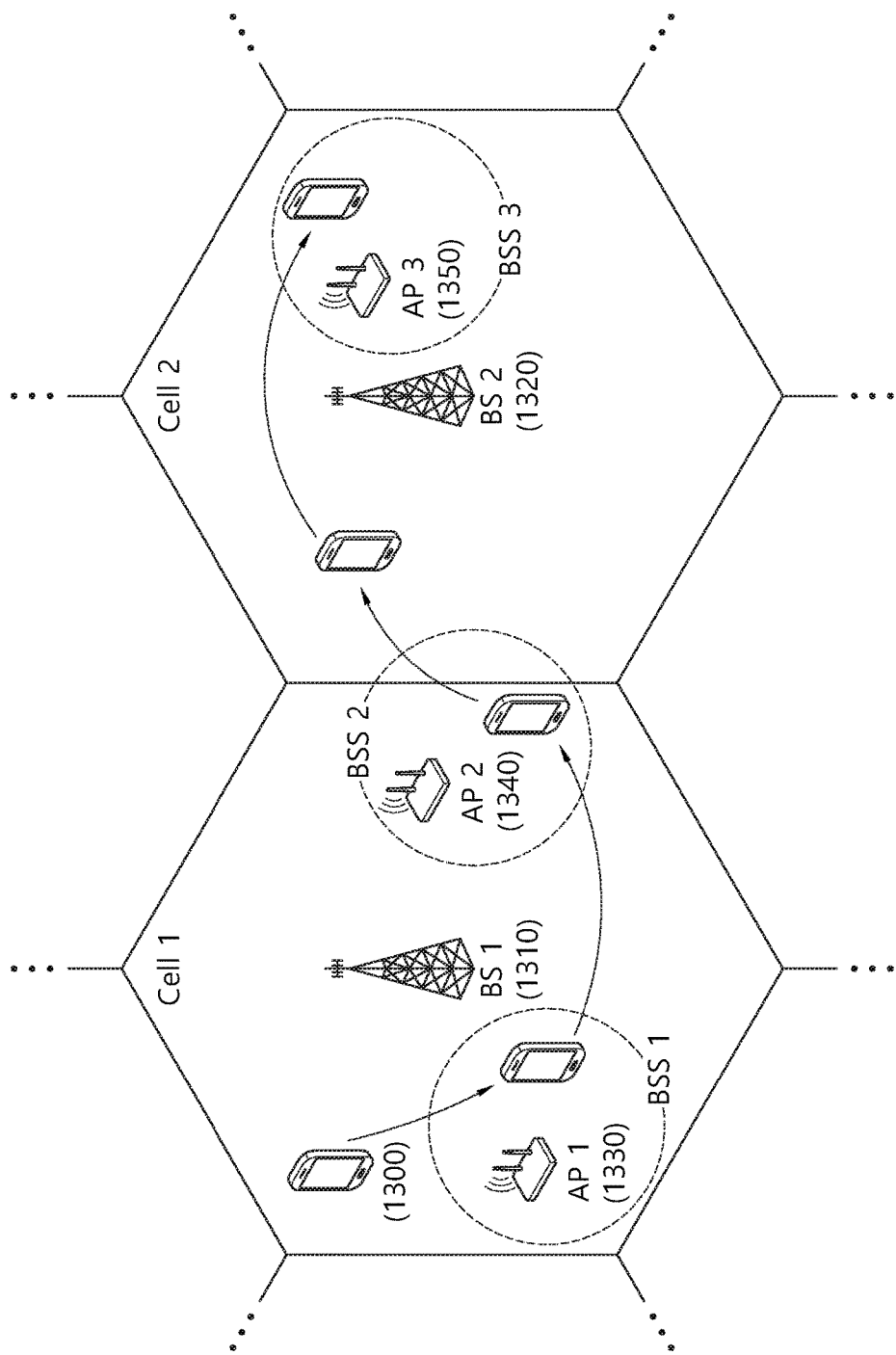
FIG. 8 is a diagram illustrating an example of an environment in which 3GPP access networks and WLAN access networks coexist.

FIG. 8 is a diagram illustrating an example of an environment in which 3GPP access networks and WLAN access networks coexist.

Referring to FIG. 8, as 3GPP access networks, Cell 1 is deployed around Base Station 1 1310, and Cell 2 is deployed around Base Station 2 1320. Also, as WLAN access networks, BSS (Basic Service Set) 1 is deployed around AP1 (Access Point) 1330, BSS 2 is deployed around AP2 1340, and BSS 3 is deployed around AP3 1350 which exists within Cell 2. The coverage of the cells is indicated by solid lines, and the coverage of the BSSs is indicated by dotted lines.

It is assumed that a UE 1300 is configured to perform communication over at least either a 3GPP access network or a WLAN access network. In this case, the UE 1300 may be called a station.

Initially, the UE 1300 may establish a connection with BS 1 1310 within Cell 1 and handle traffic by a 3GPP access network.

Suppose that the UE 1300 has entered the coverage of BSS 1 while moving within the coverage of Cell 1. In this case, if traffic handling between the UE 1300 and BS 1 1310 is not smooth, or traffic handling is more smooth with the AP 1 1330, the traffic may be transferred from the 3GPP access network to the WLAN access network to ensure efficiency.

Now, the present invention will be described.

Currently, for interworking between a 3GPP network (e.g., LTE/LTE-A) and a non-3GPP network (e.g., WLAN), each measurement made on each network for interworking purpose should meet all preset conditions, in order for a UE to steer traffic from the 3GPP network to the non-3GPP network or vice versa. Traffic steering refers to steering the traffic handled (or the traffic configured to be handled) by a first network so as to be handled by a second network.

Policies on situations in which interworking will be performed may be specified by RAN rules.

The RAN rules may state that an LTE network should meet the following conditions in order to steer traffic from LTE to WLAN:

1) RSRP measurement value (measured_RSRP)<low RSRP threshold (Threshold_RSRP_low) and/or RSRQ measurement value (measured_RSRQ)<low RSRQ threshold (Threshold_RSRQ_low).

2) 3GPP load measurement value (measured_3 GPPLoad)>high 3GPP load threshold (Threshold_3 GPPLoad_High).

That is, the measurement value of RSRP/RSRQ in LTE as the first network is lower than a threshold, and the load measurement value is higher than a threshold.

3) WLAN load measurement value (measured_WLAN-Load)<low WLAN load threshold (Threshold_WLANLoad_low).

4) WLAN signal strength measurement value (measured_WLANsignal)>high WLAN signal strength threshold (Threshold_WLANsignal_high).

That is, the signal strength of WLAN as the second network is higher than a threshold and the load measurement value is lower than a threshold.

It can be determined whether each condition is met or not by measuring a specific parameter (the RSRP measurement value, 3GPP load measurement value, WLAN load measurement value, or WLAN signal strength measurement value in the above example) and comparing the measurement with a threshold for the parameter.

Other parameters for deciding whether to perform interworking or not may include WLAN channel utilization, WLAN backhaul data rate, WLAN uplink backhaul data rate, etc.

As described above, in the conventional art, each network may be given a plurality of conditions to steer traffic by interworking, and all of these conditions should be met in order to perform traffic steering.

However, such an interworking mechanism may not be efficient if each condition has a different level of importance and each condition has a different relationship with each threshold. For example, it can be stated that a WLAN should meet the following conditions in order to steer traffic from LTE to the WLAN: 1) WLAN load measurement value (measured_WLANLoad)<low WLAN load threshold (Threshold_WLANLoad_low); and 2) WLAN signal strength measurement value (measured_WLANsignal)>high WLAN signal strength threshold (Threshold_WLANsignal_high). By the way, the WLAN load measurement value may be only slightly higher than the threshold, and the WLAN signal strength measurement value may be only slightly higher than the threshold. In this case, traffic steering to the WLAN is not possible in the conventional art, which may be considered inefficient.

To solve this problem, the present invention proposes the introduction of a single parameter, which is obtained by combining a plurality of parameters for interworking, as a criterion for evaluating whether to perform interworking or not.

For example, the single parameter may be obtained by multiplying a plurality of parameters, such as the WLAN load measurement value, WLAN signal strength measurement value, and WLAN channel utilization, by factors of different levels of importance and then adding all the products together. Such a single parameter may be a parameter by which expected throughput (ETP) can be estimated. That is, the ETP may be a performance metric which is calculated by taking a plurality of parameters for deciding whether to perform traffic steering or not into consideration and combining them together. In the present invention, it can be decided whether to perform traffic steering or not, based on the single parameter. To this end, a network may notify UE of a threshold for the single parameter.

When a threshold for the single parameter (ETP) is given, traffic can be steered from a 3GPP network to a non-3GPP network as long as a result of comparing the single parameter and the threshold shows that the condition is met, regardless of whether the measurements (e.g., WLAN load measurement value) of other parameters exceed the corresponding thresholds or not.

Figure 9:
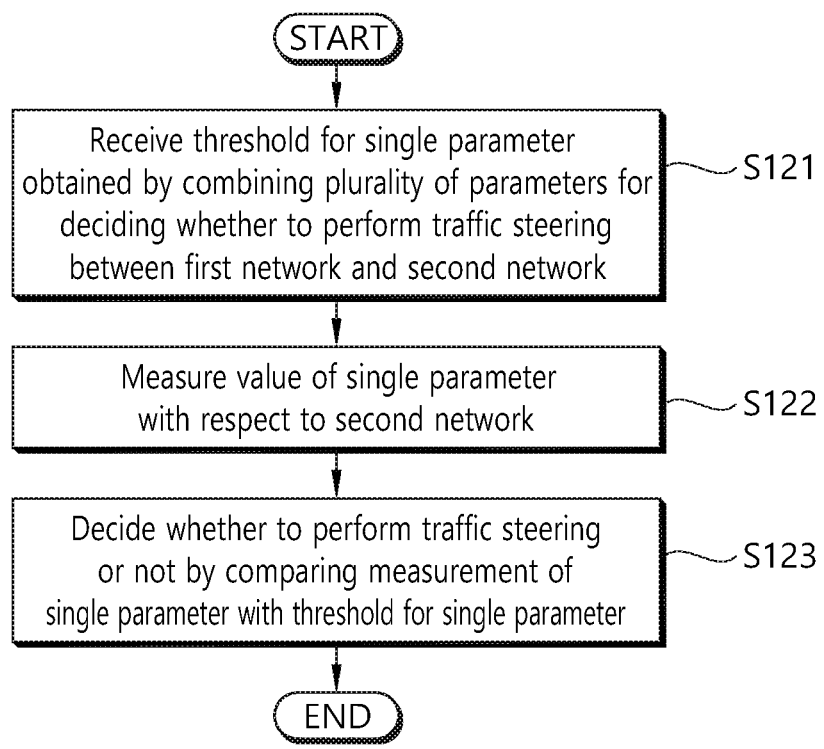
FIG. 9 illustrates a method for a UE to perform interworking according to an exemplary embodiment of the present invention.

FIG. 9 illustrates a method for a UE to perform interworking according to an exemplary embodiment of the present invention.

A UE receives a threshold (Threshold_ETP) for a single parameter obtained by combining a plurality of parameters for deciding whether to perform traffic steering between a first network and a second network (S121). The first network may be LTE/LTE-A, which is a 3GPP network, and the second network may be a WLAN. As described above, the single parameter may be expected throughput (ETP).

The plurality of parameters may include, for example, the channel utilization, downlink backhaul data rate, and uplink backhaul data rate in the second network. In this case, the single parameter may be a combination of the plurality of parameters, as in a1* (channel utilization in second network)+a2* (downlink backhaul data rate in second network)+(uplink backhaul data rate in second network). a1, a2, and a3 are factors which are set or predetermined for the respective parameters. That is, the single parameter may be a function that has the plurality of parameters as variables.

The UE measures the value of the single parameter with respect to the second network (S122).

The UE decides whether to perform traffic steering or not by comparing the measurement of the single parameter with the threshold (Threshold_ETP) (S123). For example, if the value of the single parameter with respect to the second network is higher than the threshold (Threshold_ETP), the traffic handled by the first network is steered so as to be handled by the second network.

When steering traffic from the first network to the second network, there may be a plurality of parameters representing conditions the first network has to meet. The plurality of parameters representing conditions the first network has to meet may include at least two of the following: the RSRP (reference signal received power) and RSRQ (reference signal received quality) measurement values of the first network and the load measurement value of the first network.

If the value of the single parameter with respect to the second network is higher than the threshold (Threshold_ETP), traffic may be steered from the first network to the second network, regardless of whether the conditions for other parameters for steering traffic from the first network to the second network are met or not.

More specifically, if the value of the single parameter with respect to the second network is higher than the threshold (Threshold_ETP), traffic may be steered from the first network to the second network, regardless of whether the conditions for the parameters for the second network are met or not, as long as the conditions for the first network required for steering traffic from the first network to the second network are met.

That is, supposed that the conditions for the first network required for steering traffic from the first network to the second network are C1 and C2 and the conditions for the second network are C3, C4, and C5 (ETP). C1, C2, C3, and C4 are the existing conditions (e.g., the RSRP/RSRQ in the first network, the load in the first network, the load in the second network, and the signal strength in the second network, respectively), and C5 (ETP) is the condition for the single parameter according to the present invention. If the UE understands C5 (ETP) and supports the measurement of it and a network notifies the UE of a threshold (Threshold_ETP) for C5 (ETP), the UE may steer traffic from the first network to the second network as long as C1 and C2 are met, even if the conditions C3 and C4 are not met, as long as C5 (ETP) is higher than the threshold (Threshold_ETP) and the conditions C1 and C2 are met.

In another method, if the value of the single parameter with respect to the second network is higher than the threshold (Threshold_ETP), traffic may be steered from the first network to the second network, regardless of whether the conditions for the parameters for the first network required for steering traffic from the first network to the second network are met or not and regardless of whether the conditions for the parameters for the second network are met or not.

That is, suppose that the conditions for the first network required for steering traffic from the first network to the second network are C1 and C2 and the conditions for the second network are C3, C4, and C5 (ETP). C1, C2, C3, and C4 are the existing conditions, and C5 (ETP) is the condition for the single parameter according to the present invention. If the UE understands C5 (ETP) and supports the measurement of it and a network notifies the UE of a threshold (Threshold_ETP) for C5 (ETP), the UE may steer traffic from the first network to the second network, regardless of whether the conditions C1, C2, C3, and C4 are met or not, as long as C5 (ETP) is higher than the threshold (Threshold_ETP).

Additionally, if the value of the single parameter is higher than the threshold, the UE may report the value of the single parameter to the base station before performing traffic steering.

If the value of the single parameter with respect to the second network is lower than the threshold (Threshold_ETP), the traffic handled by the second network may be steered so as to be handled by the first network. If the value of the single parameter with respect to the second network is lower than the threshold (Threshold_ETP), the traffic may be steered from the second network to the first network, regardless of whether the conditions for other parameters for steering traffic from the second network to the first network are met or not. Additionally, if the value of the single parameter is lower than the threshold, the UE may report the value of the single parameter to the base station before performing traffic steering.

In this method, if the value of the single parameter is close to the threshold, the threshold (Threshold_ETP$_{1\text{-}To\text{-}2}$) for the single parameter for steering traffic from the first network to the second network may be different from the threshold (Threshold_ETP$_{2\text{-}To\text{-}1}$) for the single parameter for steering traffic from the second network to the first network, in order to avoid the problem that the UE repeatedly re-selects between the first network and the second network—so called "ping-pong".

In another method to solve the ping-pong problem, the threshold (Threshold_ETP$_{1\text{-}To\text{-}2}$) for the single parameter for steering traffic from the first network to the second network and the threshold (Threshold_ETP$_{2\text{-}To\text{-}1}$) for the single parameter for steering traffic from the second network to the first network may have the same value by default, and a hysteresis value may be added when evaluating the condition for the single parameter for steering traffic from the second network to the first network.

In the method above, it is supposed that the UE supports ETP measurement on the second network. If the UE does not support ETP measurement on the second network, it can be decided whether to perform traffic steering or not by using the existing RAN rules.

Meanwhile, a unit of data for traffic steering may be an IP flow, PDN connectivity, APN, bearer, or packet.

The method of FIG. 9 may apply as follows in the following two situations:

1) Traffic steering from 3GPP network (LTE/LTE-A) to non-3GPP network (WLAN).

The UE decides whether there is a given threshold for ETP for steering traffic from a 3GPP network to a non-3GPP network.

If a threshold for ETP is given and the UE supports ETP measurement on the non-3GPP network, the UE decides whether conditions for the 3GPP network required for steering traffic from the 3GPP network to the non-3GPP network are met or not.

If the ETP measurement exceeds the threshold for the non-3GPP network, the UE performs traffic steering from the 3GPP network to the non-3GPP network, regardless of whether the other conditions for steering traffic from the 3GPP network to the non-3GPP network are met or not.

If there is no given threshold for ETP for steering traffic from the 3GPP network to the non-3GPP network or the UE does not support ETP measurement on the non-3GPP network, the UE performs traffic steering in the same manner as in the conventional art. For example, the UE decides whether the conditions associated with the non-3GPP network or the conditions associated with the 3GPP network are met or not, in order to steer traffic from the 3GPP network to the non-3GPP network.

2) Traffic steering from non-3GPP network (WLAN) to 3GPPP network (LTE/LTE-A).

The UE decides whether there is a given threshold for ETP for steering traffic from a non-3GPP network to a 3GPP network.

Suppose that a threshold for ETP is given and the UE supports ETP measurement on the non-3GPP network. In this case, if the ETP measurement is lower than the threshold, the UE may perform traffic steering from the non-3GPP network to the 3GPP network, regardless of whether the other conditions for steering traffic from the non-3GPP network to the 3GPP network are met or not.

Also, the UE may decide whether the conditions for the 3GPP network required for steering traffic from the non-3GPP network to the 3GPP network are met or not.

If there is no given threshold for ETP for steering traffic from the non-3GPP network to the 3GPP network and the UE does not support ETP measurement on the non-3GPP network, the UE performs traffic steering in the same manner as in the conventional art. For example, the UE decides whether the conditions associated with the 3GPP network or the conditions associated with the non-3GPP network are met or not, in order to steer traffic from the 3GPP network to the non-3GPP network.

Meanwhile, a network may provide the UE with RAN assistance information via dedicated signaling or broadcast signaling, in order to control or assist in the UE's interworking, that is, traffic steering.

The RAN assistance information may be provided in various ways, for example, by the following methods:

1) Individual RAN assistance information: The UE may be provided with individual RAN assistance information on each serving cell in which traffic steering is permitted, and each individual RAN assistance information may include the cell ID of a corresponding serving cell.

2) Common RAN assistance information: The UE may be provided with a single piece of RAN assistance information including information on all serving cells in which traffic steering is permitted. In this case, the RAN assistance information may include the cell IDs of all serving cells in which the UE is permitted to steer traffic.

3) Set of RAN assistance information: Information indicating the relationship between RAN assistance information and serving cells to which the RAN assistance information applies may be provided. That is, a network may provide information indicating the linkage between a set of multiple pieces of RAN assistance information and the IDs of serving cells to which each piece of RAN assistance information in the set applies.

4) A network may provide individual RAN assistance information for each bearer type.

The RAN assistance information may include thresholds for conditions associated with 3GPP networks and conditions associated with non-3GPP networks which are used for interworking policies.

For example, the thresholds associated with 3GPP networks may include thresholds for RSRP, RSRQ, and 3GPP network load (Threshold_RSRP_offload, Threshold_RSRQ_offload, Threshold_Load_offload, Threshold_RSRP_onload, Threshold_RSRQ_onload, Threshold_Load_onload, etc.). The thresholds associated with non-3GPP networks may include thresholds for RSSI (received signal strength indication), backhaul data rate, channel utilization, and ETP. That is, a threshold for the single parameter of FIG. 9 may be provided by means of RAN assistance information. Alternatively, a threshold for the single parameter may be provided via a separate signal, rather than by means of RAN assistance information.

The RAN assistance information may indicate the ID of a WLAN through at least one field of the following table:

TABLE 2

| field | Description |
| --- | --- |
| BSSID | Basic service set identifier. BSSID may be the MAC address of a wireless AP. |
| SSID | Service Set Identifier. |

TABLE 2-continued

| field | Description |
| --- | --- |
| HES SID | Homogeneous Extended Service Set Identifier. |
| Domain Name List | A list containing one or more domain names of an entity operating a WLAN access network. |
| Operating class, channel number | Indicates a target WLAN frequency. |

Meanwhile, traffic steering may be performed primarily under the control of a network or primarily by the UE itself.

Figure 10:
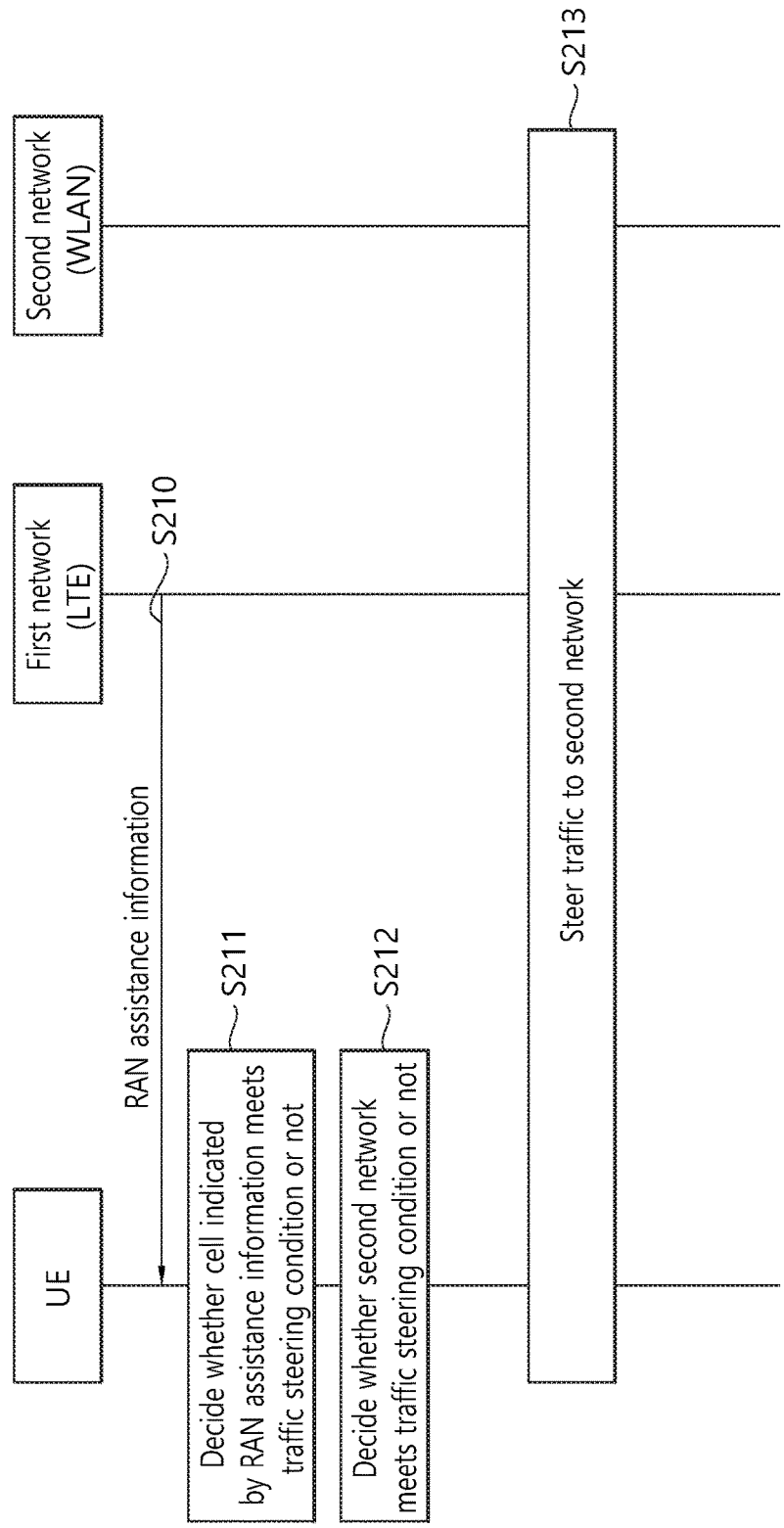
FIG. 10 illustrates a method for performing traffic steering primarily based on a network's control.

FIG. 10 illustrates a method for performing traffic steering primarily based on a network's control.

A first network provides a UE with RAN assistance information (S210). The RAN assistance information may give the UE of a notification or indication of whether traffic steering is permitted in each serving cell. Also, the RAN assistance information may include WLAN-related thresholds. The WLAN-related thresholds may include a channel utilization-related threshold, UL/DL backhaul thresholds, a signal level threshold, an ETP threshold, etc.

The first network (LTE/LTE-A) may provide the UE with individual RAN assistance information including the ID of each serving cell in which traffic steering is permitted. The individual RAN assistance information may be provided via dedicated signaling/broadcast signaling. Alternatively, the first network may provide the UE with a single piece of common RAN assistance information including the IDs of all serving cells permitted. Alternatively, the first network may provide the UE with information indicating the linkage between multiple pieces of RAN assistance information and the IDs of serving cells to which each piece of RAN assistance information applies.

The UE receives the RAN assistance information and then decides whether a cell indicated by the RAN assistance information meets a traffic steering condition or not (S211).

For example, in order to steer traffic to a WLAN (or in the reverse direction), the UE compares a measurement value of each serving cell indicated by the corresponding RAN assistance information with a corresponding threshold.

The UE decides whether a second network meets a traffic steering condition or not (S212).

If the second network (WLAN) meets the traffic steering condition, the UE performs traffic steering such that traffic in a serving cell in which traffic steering is permitted and which meets the traffic steering condition can be handled by a WLAN (S213).

Although not shown in FIG. 10, if a serving cell in which traffic steering is permitted is disabled after traffic is steered to the second network WLAN, the UE may compare measurements on a primary cell with thresholds that are set for the primary cell for traffic steering to 3GPP.

If a permitted serving cell is deactivated after traffic is steered to the second network (WLAN), the UE may compare measurements on a primary cell with thresholds that are set for the primary cell for traffic steering to 3GPP.

Figure 11:
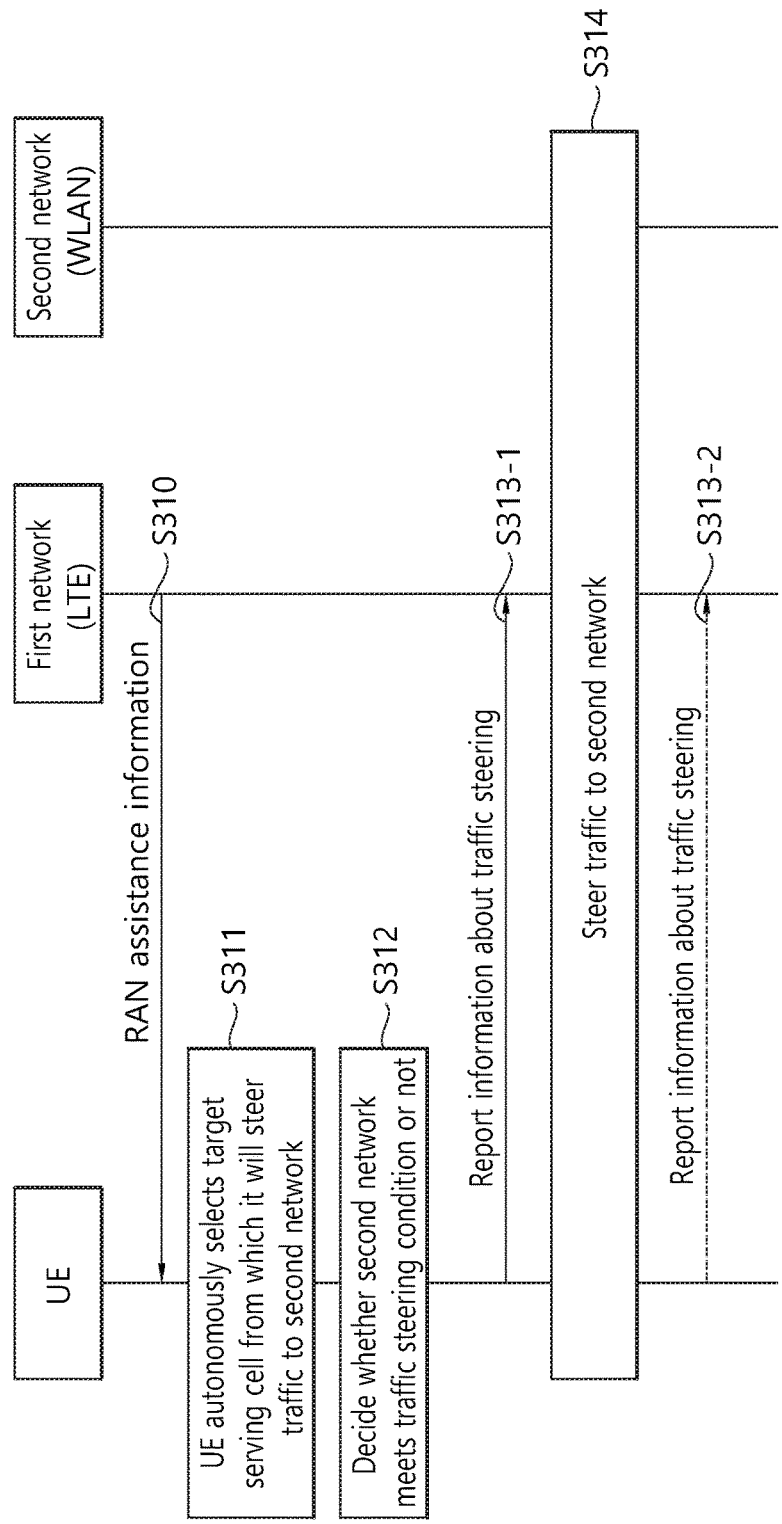
FIG. 11 illustrates a method for performing UE-based traffic steering.

FIG. 11 illustrates a method for performing UE-based traffic steering.

Referring to FIG. 11, a first network provides RAN assistance information (S310).

The first network (LTE/LTE-A) may provide the UE with individual RAN assistance information. That is, the first network (LTE/LTE-A) may provide RAN assistance information on each individual serving cell. Alternatively, the first network may provide the UE with one piece of common RAN assistance information including the IDs of all serving cells permitted. Alternatively, the first network may provide the UE with information indicating the linkage between multiple pieces of RAN assistance information and the IDs of serving cells to which each piece of RAN assistance information applies.

The UE may autonomously select a target serving cell from which it will steer traffic to a second network (WLAN) (S311). The UE decides whether the second network meets a traffic steering condition or not (S312).

If the traffic steering condition is met, the UE performs traffic steering to the second network (S314). The UE may determine from which serving cell to steer traffic to the WLAN or to which serving cell to steer traffic from the WLAN, based on the load in the 3GPP serving cell, the backhaul load in the 3GPP serving cell, etc.

That is, in the method of FIG. 11, the UE may autonomously determine which serving cell's traffic to handle by the WLAN or which serving cell to allow to handle the traffic in the WLAN. That is, once the condition for steering traffic to the WLAN is met, the UE may perform traffic steering such that traffic in a serving cell selected by itself can be handled by the WLAN. If the condition for steering traffic to LTE is met, the UE performs traffic steering such that the traffic handled by the WLAN is handled by a serving cell of LTE. The serving cell may be an existing cell that has handled traffic.

Meanwhile, when the UE decides to perform traffic steering, it may notify the network about this before actual traffic steering (S313-1). Alternatively, the UE may steer traffic to the WLAN and then notify the network about this (S313-2).

When the UE notifies a network that it has decided to perform traffic steering or that it has performed traffic steering, it may give the network an indication of at least one among bearer ID, EPS bearer ID, APN, IP flow, cell ID, and WLAN ID.

Hereinafter, a method of how a UE in an RRC connection state deals with RAN assistance information for traffic steering will be described.

Suppose that carrier aggregation or dual connectivity (DC) is configured for a UE to assign one or more serving cells to the UE. Carrier aggregation refers to assigning the UE with different serving cells for the same base station. In carrier aggregation, a serving cell with which the UE establishes an RRC connection and to which the UE can transmit an uplink control channel is called a primary cell, and the other serving cells are called secondary cells.

Dual connectivity refers to the ability of a UE to connect with two different base stations. Of these two base stations, the base station with which the UE establishes a primary connection may be called a master base station, and the other base station may be called a secondary base station. Carrier aggregation may be supported for the master base station and the secondary base station each. For example, while the UE is establishing a dual connection with Base Station A as the master base station and Base Station B as the secondary base station, the primary cell and the secondary cells may be configured for both Base Station A and Base Station B.

Hereinafter, the use of RAN assistance information provided by Cell A may mean that the UE receives RAN assistance information provided by Cell A and compares measurements on Cell A with the RAN assistance information.

Method 1: Comparison of Each Cell

In a network, the primary cells of the master base station and secondary base station and the secondary cells of the master base station and secondary base station may provide RAN assistance information via broadcast signaling or dedicated signaling.

The UE may use the RAN assistance information provided by each of the primary cells and secondary cells. The UE compares measurements on the primary cells and secondary cells with the RAN assistance information provided by the primary cells and the secondary cells.

For example, measurements on the primary cell of the master base station are compared with the RAN assistance information provided by the primary cell of the master base station. Measurements on a secondary cell of the master base station are compared with the RAN assistance information provided by the secondary cell of the master base station.

This method may be used to steer traffic from a 3GPP network to a WLAN or vice versa.

If a secondary cell of the master base station and/or the primary cell of the secondary base station is disabled/deactivated, the UE may use the RAN assistance information provided by the primary cell of the master base station.

In a dual connectivity situation, if a secondary cell of the secondary base station is disabled/deactivated and the primary cell of the secondary base station is abled/activated, the UE may use the RAN assistance information provided by the primary cell of the secondary base station.

Method 2: Comparison of Primary Cell of Master Base Station

In a network, the primary cells of the master base station and secondary base station and the secondary cells of the master base station and secondary base station may provide RAN assistance information via broadcast signaling or dedicated signaling.

The UE may use only the RAN assistance information provided by the primary cell of the master base station, and compare only measurements on the primary cell of the master base station with the RAN assistance information. In other words, the UE may ignore the RAN assistance information provided by the primary cell of the secondary base station and the secondary cells of the master base station and secondary base station.

This method may be used to steer traffic from a 3GPP network to a WLAN or vice versa.

Method 3: Comparison of Primary Cells

In a network, the primary cells of the master base station and secondary base station and the secondary cells of the master base station and secondary base station may provide RAN assistance information via broadcast signaling or dedicated signaling.

The UE may use only the RAN assistance information provided by the primary cells of the master base station and secondary base station, and compare only measurements on the primary cells of the master base station and secondary base station with the RAN assistance information provided by the primary cells of the master base station and secondary base station. In other words, the UE may ignore the RAN assistance information provided by the secondary cells of the master base station and secondary base station.

This method may be used to steer traffic from a 3GPP network to a WLAN or vice versa.

In a dual connectivity situation, if the primary cell of the secondary base station is disabled/deactivated, the UE may use the RAN assistance information provided by the primary cell of the master base station.

Method 4: Comparison of Primary Cell of Master Base Station for Traffic Steering from WLAN In a network, the primary cells of the master base station and secondary base station and the secondary cells of the master base station and secondary base station may provide RAN assistance information via broadcast signaling or dedicated signaling.

For traffic steering from a 3GPP network to a WLAN, the UE uses the RAN assistance information provided by each of the primary cells and secondary cells of the master base station and secondary base station. For example, for traffic steering to a WLAN from the primary cell of the master base station, the UE uses the RAN assistance information provided by the primary cell of the master base station. On the other hand, for traffic steering to a WLAN from a secondary cell of the master base station, the UE uses the RAN assistance information provided by the secondary cell of the master base station.

If a secondary cell of the master base station and/or the primary cell of the secondary base station is disabled/deactivated but the primary cell of the secondary base station is abled/activated, the UE uses the RAN assistance information provided by the primary cell of the secondary base station.

For traffic steering from a WLAN to a 3GPP network, the UE uses only the RAN assistance information provided by the primary cell of the master base station, and compares only measurements on the primary cell of the master base station with the RAN assistance information.

In other words, the UE may ignore the RAN assistance information provided by the primary cell of the secondary base station and the secondary cells of the master base station and secondary base station.

Method 5: Comparison of Primary Cells for Traffic Steering from WLAN

In a network, the primary cells of the master base station and secondary base station and the secondary cells of the master base station and secondary base station may provide RAN assistance information via broadcast signaling or dedicated signaling.

For traffic steering from a 3GPP network to a WLAN, the UE may use the RAN assistance information provided by the primary cells of the master base station and secondary base station and the secondary cells of the master base station and secondary base station.

For example, for traffic steering to a WLAN from the primary cell of the master base station, the UE uses the RAN assistance information provided by the primary cell of the master base station, whereas, for traffic steering to a WLAN from a secondary cell of the master base station, the UE uses the RAN assistance information provided by the secondary cell of the master base station.

If a secondary cell of the master base station and/or the primary cell of the secondary base station is disabled/deactivated, the UE uses the RAN assistance information provided by the primary cell of the master base station.

In a dual connectivity situation, if a secondary cell of the secondary base station is disabled/deactivated or the primary cell of the secondary base station is abled/activated, the UE uses the RAN assistance information provided by the primary cell of the secondary base station.

For traffic steering from a WLAN to a 3GPP network, the UE uses only the RAN assistance information provided by the primary cells of the master base station and secondary base station. In other words, the UE ignores the RAN assistance information provided by the secondary cells of the master base station and secondary base station.

For traffic steering to a WLAN from the master base station, the UE uses only the RAN assistance information provided by the primary cell of the master base station. For traffic steering from a WLAN to the master base station, the UE uses only the RAN assistance information provided by the primary cell of the secondary base station.

In a dual connectivity situation, if the primary cell of the secondary base station is disabled/deactivated, the UE uses the RAN assistance information provided by the primary cell of the master base station.

Method 6: Network Indication

In a network, the primary cells of the master base station and secondary base station and the secondary cells of the master base station and secondary base station may provide RAN assistance information via broadcast signaling or dedicated signaling.

When configuring a specific cell for the UE, a network may indicate whether traffic steering is permitted in the specific cell or not. The specific cell may be the primary cell of the secondary base station or a secondary cell of the master base station or secondary base station.

If traffic steering is permitted in the specific cell, the network may indicate from which serving cell to receive RAN assistance information and which serving cell's measurements to compare with the thresholds in the RAN assistance information.

Figure 12:
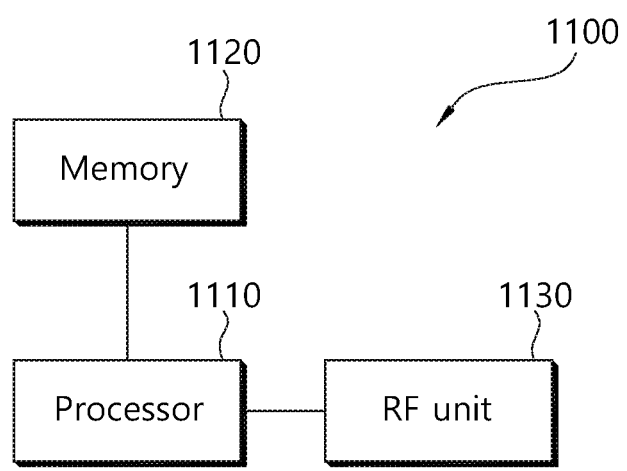
FIG. 12 is a block diagram of a UE by which an exemplary embodiment of the present invention is implemented.

FIG. 12 is a block diagram of a UE by which an exemplary embodiment of the present invention is implemented.

Referring to FIG. 12, a UE 1100 includes a processor 1110, a memory 1120, and an RF unit (radio frequency unit) 1130. The UE 1100 may be connected to a first network (3GPP-based access network; LTE/LTE-A).

The processor 1110 implements proposed functions, processes and/or methods. The processor 1110 receives a threshold for a single parameter obtained by combining a plurality of parameters for deciding whether to perform traffic steering between a first network and a second network, measures the value of the single parameter with respect to the second network, and decides whether to perform traffic steering or not by comparing a measurement of the single parameter with the threshold.

The RF unit 1130 is connected to the processor 1110, and transmits and/or receives radio signals. The RF unit 1130 may include one or more RF units for communication with 3GPP-based access networks and non-3GPP-based access networks.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing interworking in a wireless communication system, the method performed by user equipment (UE) and comprising:

receiving at least one threshold for a single parameter obtained by combining a first plurality of parameters related to performing traffic steering between a first network and a second network;

deciding whether to perform the traffic steering by comparing value of the single parameter with the received at least one threshold; and performing the traffic steering if the value is higher than the at least one threshold, wherein the single parameter is obtained by multiplying each of the first plurality of parameters by a factor indicating a corresponding level of importance.

2. The method of claim 1, wherein the first plurality of parameters are related to channel utilization, downlink backhaul data rate, and uplink backhaul data rate in the second network.

3. The method of claim 1, wherein performing the traffic steering comprises the first network meeting a second plurality of parameters representing required conditions.

4. The method of claim 3, wherein the second plurality of parameters comprise at least two of RSRP (reference signal received power) of the first network, RSRQ (reference signal receive quality) measurement values of the first network and a load measurement value of the first network.

5. The method of claim 1, wherein the traffic steering is performed regardless of whether other conditions for steering traffic from the first network to the second network are met if the value is higher than the at least one threshold.

6. The method of claim 1, wherein traffic is steered from the second network to the first network if the value is lower than the at least one threshold.

7. The method of claim 6, wherein the traffic is steered from the second network to the first network regardless of whether other conditions for steering traffic from the second network to the first network are met if the value is lower than the at least one threshold.

8. The method of claim 1, wherein a first threshold for steering traffic from the first network to the second network and a second threshold for steering traffic from the second network to the first network are different.

9. The method of claim 1, wherein a first threshold for steering traffic from the first network to the second network and a second threshold for steering traffic from the second network to the first network have a same value.

10. A user equipment (UE) for performing interworking in a wireless communication system, the UE comprising:

an RF (radio frequency) unit that transmits and receives radio signals; and a processor functionally coupled to the RF unit to operate, wherein the processor:

controls the RF unit to receive at least one threshold for a single parameter obtained by combining a first plurality of parameters related to performing traffic steering between a first network and a second network;

decides whether to perform the traffic steering by comparing a value of the single parameter with the received at least one threshold; and performs the traffic steering if the value is higher than the at least one threshold, wherein the single parameter is obtained by multiplying each of the first plurality of parameters by a factor indicating a corresponding level of importance.

11. The UE of claim 10, wherein the first plurality of parameters are related to channel utilization, downlink backhaul data rate, and uplink backhaul data rate in the second network.

12. The UE of claim 10, wherein performing the traffic steering comprises the first network meeting a second plurality of parameters representing conditions of the first network.

13. The UE of claim 12, wherein the second plurality of parameters comprise at least two of RSRP (reference signal received power) of the first network, RSRQ (reference signal receive quality) measurement values of the first network and a load measurement value of the first network.

14. The UE of claim 10, wherein the traffic steering is performed regardless of whether other conditions for steering traffic from the first network to the second network are met if the value is higher than the at least one threshold.

15. The UE of claim 10, wherein traffic is steered from the second network to the first network if the value is lower than the at least one threshold.

16. The UE of claim 10, wherein the traffic is steered from the second network to the first network regardless of whether other conditions for steering traffic from the second network to the first network are met if the value is lower than the at least one threshold.

17. The UE of claim 10, wherein a first threshold for steering traffic from the first network to the second network and a second threshold for steering traffic from the second network to the first network are different.

18. The UE of claim 10, wherein a first threshold for steering traffic from the first network to the second network and a second threshold for steering traffic from the second network to the first network have a same value.

\* \* \* \* \*